United States Patent
Zang et al.

(12) 
(10) Patent No.: US 11,619,917 B2
(45) Date of Patent: Apr. 4, 2023

(54) MOTOR VEHICLE COOLING CONTROL SYSTEM AND METHOD

(71) Applicant: Robert Bosch GmbH, Stuttgart (DE)

(72) Inventors: Xiaoyun Zang, Shanghai (CN); Alexander Boronka, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 531 days.

(21) Appl. No.: 16/354,439

(22) Filed: Mar. 15, 2019

(65) Prior Publication Data

US 2019/0286079 A1 Sep. 19, 2019

(30) Foreign Application Priority Data

Mar. 19, 2018 (CN) .......................... 201810225004.8

(51) Int. Cl.
| | | |
|---|---|---|
| *G05B 13/04* | (2006.01) | |
| *B60L 3/00* | (2019.01) | |
| *B60L 50/50* | (2019.01) | |
| *F25B 49/00* | (2006.01) | |

(52) U.S. Cl.
CPC ............. *G05B 13/048* (2013.01); *B60L 3/00* (2013.01); *B60L 3/0023* (2013.01); *B60L 50/50* (2019.02); *B60L 2240/36* (2013.01); *B60L 2240/425* (2013.01); *B60L 2240/485* (2013.01); *B60L 2240/545* (2013.01); *F25B 49/00* (2013.01); *F25B 2700/21* (2013.01)

(58) Field of Classification Search
CPC .. B60L 50/50; B60L 58/10; B60L 3/04; B60L 58/12; B60L 11/18; B60L 3/00; G06F 8/65; G05B 15/02; G05B 13/04; H01M 10/613; B60K 11/02; B60H 1/00742
See application file for complete search history.

(56) References Cited

U.S. PATENT DOCUMENTS

| | | | | |
|---|---|---|---|---|
| 9,886,841 | B1 * | 2/2018 | Nave ........................ | G06F 30/20 |
| 2007/0120537 | A1 * | 5/2007 | Yamamoto ............ | H01M 10/48 |
| | | | | 320/150 |

(Continued)

FOREIGN PATENT DOCUMENTS

| | | | | |
|---|---|---|---|---|
| CN | 107438833 A | * 12/2017 | ................ | G06F 8/65 |
| WO | WO-2018218520 A1 | * 12/2018 | ................ | G06F 8/65 |
| WO | WO-2019017991 A1 | * 1/2019 | ............ | H01M 50/20 |

*Primary Examiner* — Yuri Kan

(74) *Attorney, Agent, or Firm* — Michael Best & Friedrich LLP

(57) ABSTRACT

A cooling control system and method for a motor vehicle comprising: a server unit and N client units, wherein N is greater than or equal to 1, the server unit being in data connection with the N client units via a wireless network, the N client units configured to be arranged on N motor vehicles respectively, each client unit configured to perform real-time collection and storage of calculation input data on the corresponding motor vehicle for evaluating a temperature of a unit requiring cooling on the motor vehicle, perform real-time collection and storage of temperature data of the unit requiring cooling, predict, using the collected calculation input data, temperature data at a future time of the unit requiring cooling based on a predictive mathematical model determined by the server unit (200), and enable the selective cooling in advance of the unit requiring cooling based on the predicted temperature data.

24 Claims, 4 Drawing Sheets

(56) References Cited

U.S. PATENT DOCUMENTS

| | | | | |
|---|---|---|---|---|
| 2007/0272173 A1* | 11/2007 | Reckels | ............... | F01P 7/167 |
| | | | | 123/41.11 |
| 2008/0073057 A1* | 3/2008 | Kojima | ............. | B60H 1/00742 |
| | | | | 165/43 |
| 2010/0114437 A1* | 5/2010 | Boss | .................... | B60W 10/22 |
| | | | | 701/48 |
| 2011/0106358 A1* | 5/2011 | Sawada | ............... | B60K 11/02 |
| | | | | 701/22 |
| 2011/0202418 A1* | 8/2011 | Kempton | ............... | H02J 3/008 |
| | | | | 705/26.1 |
| 2014/0012445 A1* | 1/2014 | Fleckenstein | ....... | H01M 10/625 |
| | | | | 701/22 |
| 2014/0012447 A1* | 1/2014 | Gao | ....................... | B60L 53/11 |
| | | | | 701/22 |
| 2015/0371151 A1* | 12/2015 | Georgescu | ............ | G06N 20/00 |
| | | | | 706/12 |
| 2017/0101026 A1* | 4/2017 | Lu | ........................... | B60L 58/12 |
| 2017/0288401 A1* | 10/2017 | Hummon | ............... | G05B 15/02 |
| 2018/0143257 A1* | 5/2018 | Garcia | ................. | G01R 31/382 |
| 2019/0024781 A1* | 1/2019 | Chrungoo | .......... | G08G 1/162 |
| 2020/0164763 A1* | 5/2020 | Holme | ................... | B60L 58/10 |
| 2020/0227791 A1* | 7/2020 | Flueckiger | .......... | H01M 10/425 |

\* cited by examiner

MOTOR VEHICLE COOLING CONTROL SYSTEM AND METHOD

BACKGROUND OF THE INVENTION

The present application generally relates to motor vehicles, in particular a cooling control system and method for any component requiring to be cooled in an electric vehicle.

Due to environmental considerations and ever more stringent exhaust gas emission regulations, electric vehicles are becoming ever more commonplace. Where electric vehicles are concerned, heat control is a very important subject. For example, during electric vehicle operation, units such as the battery pack, battery management unit, inverter, communication module, gearbox and electric motor will continuously generate large amounts of heat. If overheating occurs, forcible safety measures will generally be adopted, such as reducing the operating power of the corresponding element or forcibly stopping the operation of the electric vehicle in order to avoid failure of the element. In other words, if it is not possible to accurately predict a temperature increase in an element in advance and cool the element accordingly, the driving experience will be significantly affected.

In conventional electric vehicle cooling control, a potential overheating condition is predicted in advance mainly on the basis of a driving state of an individual vehicle, and/or on the basis of road information obtained by navigation and satellite positioning systems such as GPS (global positioning system) or the BeiDou positioning system. For example, if a road is unobstructed, it can be predicted that the electric vehicle will accelerate, so the electric motor and the gearbox will overheat. Thus, a heat dissipation apparatus of the electric motor and the gearbox is started in advance to prevent overheating.

However, this conventional control method is inadequate, first of all because a mathematical model performing a prediction for the relevant unit of the electric vehicle is fixed, and unable to adapt to all the driving scenarios which occur in the course of actual driving. Furthermore, since navigation and satellite positioning data is used as a basis, the precision requirements for data acquisition are very stringent, otherwise the problem of overheating or inadequate cooling of the relevant unit of the electric vehicle will occur.

SUMMARY OF THE INVENTION

In view of the above problems, the aim of the present application is to propose an improved cooling control system and method for a heat-generating unit in an electric vehicle.

According to one aspect of the present application, a cooling control system for a motor vehicle, in particular an electric vehicle, is provided, comprising: a server unit and N client units, wherein N is greater than or equal to 1, the server unit being in data connection with the N client units via a wireless network, the N client units being capable of being arranged on N motor vehicles respectively, each client unit being capable of real-time collection and storage of calculation input data on the corresponding motor vehicle which can be used to evaluate a temperature of a unit requiring cooling on the motor vehicle, each client unit also being capable of real-time collection and storage of temperature data of the unit requiring cooling, each client unit also being capable of using the collected calculation input data to predict temperature data at a future time of the unit requiring cooling on the basis of a predictive mathematical model determined by the server unit, and each client unit being capable of enabling the selective cooling in advance of the unit requiring cooling on the basis of the predicted temperature data, and wherein the server unit is capable of receiving the collected calculation input data and temperature data from the N client units and is capable, on the basis of the received data, of optimizing and improving the predictive mathematical model or of creating a new predictive mathematical model.

Optionally, for the predictive mathematical model currently being used by each client unit, the server unit uses a portion of the calculation input data and a portion of the temperature data received from the client unit as an input and an output of the predictive mathematical model respectively, to verify whether the data matches the predictive mathematical model.

Optionally, if a verification result of the server unit indicates that the predictive mathematical model does not match data, the predictive mathematical model is replaced by the new predictive mathematical model.

Optionally, the new predictive mathematical model is selected by the server unit from a data memory of the server unit on the basis of data already received, or the new predictive mathematical model is generated by the server unit on the basis of data already received.

Optionally, if a verification result of the server unit indicates that the predictive mathematical model matches data, the server unit optimizes and improves the predictive mathematical model on the basis of data already received.

Optionally, the new predictive mathematical model or the optimized and improved predictive mathematical model is sent to the client unit for use.

Optionally, the predictive mathematical model is based on an artificial neural network calculation model, a fuzzy logic calculation model, a genetic algorithm calculation model, an adaptive learning calculation model or an artificial intelligence calculation model.

Optionally, a heat dissipation unit is provided for the unit requiring cooling in the motor vehicle, and when the predicted temperature data is greater than a specified value, the corresponding client unit can start the heat dissipation unit, so that the unit requiring cooling is cooled in advance.

Optionally, when the motor vehicle is an electric vehicle, the unit requiring cooling comprises a battery pack unit, a battery management unit, an inverter unit, an electric machine unit and a gearbox unit of the electric vehicle.

Optionally, the predictive mathematical model used on each client unit can be actively selected by a driver of the motor vehicle.

Optionally, the calculation input data comprises operating parameter data of the unit requiring cooling and/or road condition data of the motor vehicle, the road condition data being obtained from real-time navigation and/or satellite positioning data of the motor vehicle.

Optionally, based on data from multiple client units, the server unit can determine whether the predictive mathematical model of one of the multiple client units matches data thereof.

According to another aspect of the present application, a cooling control method for a motor vehicle, in particular an electric vehicle, is also provided, comprising:

providing a server unit and N client units, wherein N is greater than or equal to 1, the server unit being in data connection with the N client units via a wireless network, the N client units being capable of being arranged on N motor vehicles respectively, each client unit being capable of real-time collection and storage of calculation input data on the corresponding motor vehicle which can be used to evaluate a temperature of a unit requiring cooling on the motor vehicle, each client unit also being capable of real-time collection and storage of temperature data of the unit requiring cooling, each client unit also being capable of using the collected calculation input data to predict temperature data at a future time of the unit requiring cooling on the basis of a predictive mathematical model determined by the server unit, and each client unit being capable of enabling the selective cooling in advance of the unit requiring cooling on the basis of the predicted temperature data, and wherein the server unit is capable of receiving the collected calculation input data and temperature data from the N client units and is capable, on the basis of the received data, of optimizing and improving the predictive mathematical model or of creating a new predictive mathematical model.

Optionally, for the predictive mathematical model currently being used by each client unit, the server unit uses a portion of the calculation input data and a portion of the temperature data received from the client unit as an input and an output of the predictive mathematical model respectively, to verify whether the data matches the predictive mathematical model.

Optionally, if a verification result of the server unit indicates that the predictive mathematical model does not match data, the predictive mathematical model is replaced by the new predictive mathematical model.

Optionally, the new predictive mathematical model is selected by the server unit from a data memory of the server unit on the basis of data already received, or the new predictive mathematical model is generated by the server unit on the basis of data already received.

Optionally, if a verification result of the server unit indicates that the predictive mathematical model matches data, the server unit optimizes and improves the predictive mathematical model on the basis of data already received.

Optionally, the new predictive mathematical model or the optimized and improved predictive mathematical model is sent to the client unit for use.

Optionally, the predictive mathematical model is based on an artificial neural network calculation model, a fuzzy logic calculation model, a genetic algorithm calculation model, an adaptive learning calculation model or an artificial intelligence calculation model.

Optionally, a heat dissipation unit is provided for the unit requiring cooling in the motor vehicle, and when the predicted temperature data is greater than a specified value, the corresponding client unit can start the heat dissipation unit, so that the unit requiring cooling is cooled in advance.

Optionally, when the motor vehicle is an electric vehicle, the unit requiring cooling comprises a battery pack unit, a battery management unit, an inverter unit, an electric machine unit and a gearbox unit of the electric vehicle.

Optionally, the predictive mathematical model used on each client unit can be actively selected by a driver of the motor vehicle.

Optionally, the calculation input data comprises operating parameter data of the unit requiring cooling and/or road condition data of the motor vehicle, the road condition data being obtained from real-time navigation and/or satellite positioning data of the motor vehicle.

Optionally, based on data from multiple client units, the server unit can determine whether the predictive mathematical model of one of the multiple client units matches data thereof.

According to another aspect of the present application, also provided is a client unit capable of being mounted on a motor vehicle, in particular on an electric vehicle, the client unit being capable of real-time collection and storage of calculation input data on the motor vehicle, in particular the electric vehicle, which can be used to evaluate a temperature of a unit requiring cooling on the motor vehicle, in particular the electric vehicle, the client unit also being capable of real-time collection and storage of temperature data of the unit requiring cooling, the client unit being in data connection via a wireless network with the cooling control system described above, the client unit being capable of using the collected calculation input data to predict temperature data at a future time of the unit requiring cooling on the basis of a predictive mathematical model determined by the server unit of the cooling control system, a heat dissipation unit being provided for the unit requiring cooling in the motor vehicle, in particular the electric vehicle, and when the predicted temperature data is greater than a specified value, the client unit can start the heat dissipation unit, so that the unit requiring cooling is cooled in advance.

When the abovementioned technical means of the present application are used, the predictive mathematical model can be updated in real time on the basis of a Big Data calculation method; thus, precision requirements for data acquisition are lowered, but the precision with which the temperature of a relevant unit of a vehicle is predicted can conversely be further increased.

BRIEF DESCRIPTION OF THE DRAWINGS

The following detailed explanation and reference to the accompanying drawings below will enable a more comprehensive understanding of the abovementioned and other aspects of the present application. It is necessary to point out that the scales of the different drawings may be different in order to enable clear explanation, but this will not affect the understanding of the present application. In the drawings.

DETAILED DESCRIPTION

In the accompanying drawings of the present application, structurally identical or functionally similar features are indicated by identical reference labels.

Although the following content of the present application mainly provides an explanation relating to electric vehicles, those skilled in the art will understand that the same technology could also be applied in motor vehicles of other types, such as fuel motor vehicles.

Figure 1:
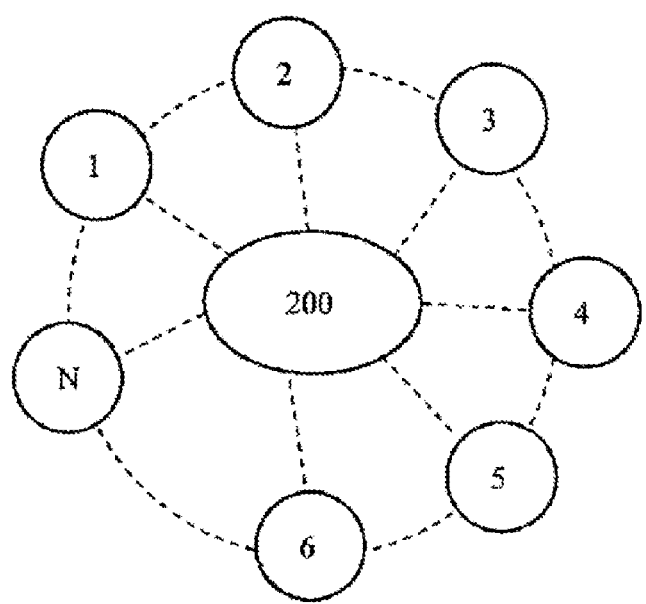
FIG. 1 shows schematically a composition drawing of an electric vehicle cooling control system according to an embodiment of the present application.

FIG. 1 shows schematically a composition drawing of an electric vehicle cooling control system according to an embodiment of the present application. The cooling control system comprises a server unit 200 and client units 1, 2, 3, 4, 5, 6, . . . , N, wherein N may be an integer greater than or equal to 1. The server unit 200 may comprise a computer or microprocessor and a data memory. The data memory may for example store received data and/or a calculation capable of executing a mathematical model on the computer or microprocessor. The computer or microprocessor may call a mathematical model stored in the data memory, and use data received in real time or data already recorded on the data memory to perform calculation. Optionally and/or alternatively, the computer or microprocessor may also update a mathematical model and/or create a new mathematical model on the basis of the most up-to-date data received.

Each client unit 1, 2, 3, 4, 5, 6, . . . , N may also comprise a computer or microprocessor and a data memory. Those skilled in the art will understand that the client may also be a microprocessor (μC) of an electric machine controller (MCU) or a whole-vehicle controller (VCU) of an electric vehicle, or be mounted on each electric vehicle as an independent control unit. Each client unit 1, 2, 3, 4, 5, 6, . . . , N may collect in real time corresponding data information for its own electric vehicle (see FIG. 2 for example). There is a wireless data connection between the server unit 200 and the client units 1, 2, 3, 4, 5, 6, . . . , N; for example, the data connection therebetween may be established via a wireless communication network such as 4G, 5G, wireless internet, wireless intranet or wireless Internet of Things, so that information collected in real time by each client unit can be promptly transmitted to the server unit 200, and the server unit 200 can also promptly transmit data to each client unit 1, 2, 3, 4, 5, 6, . . . , N. The data memory of each client unit may for example store received data and/or a mathematical model capable of performing calculation on the computer or microprocessor. The computer or microprocessor of each client unit may call a mathematical model stored in the data memory of the client unit or receive a mathematical model stored in the data memory of the server unit, and use data received in real time or data already recorded on the data memory to perform calculation.

For example, the server unit 200 and the client units 1, 2, 3, 4, 5, 6, . . . , N can be constructed in the manner of a cloud computing system, wherein the server unit 200 acts as a cloud server of a computing cloud, and provides a cloud computing service function for all the client units 1, 2, 3, 4, 5, 6, . . . , N.

Figure 2:
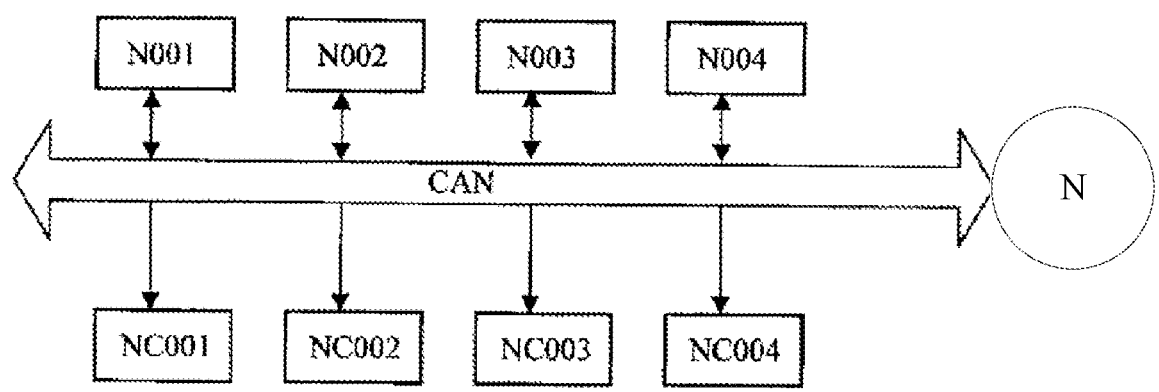
FIG. 2 shows schematically a block diagram of the application, in an electric vehicle, of an individual client unit N in the cooling control system of FIG. 1.

FIG. 2 shows schematically a block diagram of the application, in an electric vehicle, of an individual client unit N in the cooling control system of FIG. 1. As stated above, the client unit N may be a microprocessor (μC) of an electric machine controller (MCU) or a whole-vehicle controller (VCU) already present in the electric vehicle, or an independently mounted unit. The client unit N may have a wireless communication module, and is thereby in data connection with the server unit 200 as stated above. In the electric vehicle, the client unit N may be in data connection with various units requiring to be cooled, via any suitable onboard data bus, such as a CAN bus, and is thereby able to obtain temperature data of corresponding units in real time once the electric vehicle has been started. The units requiring to be cooled for example comprise a battery pack unit N001, a battery management unit N002, an inverter unit N003, an electric machine unit N004 and a gearbox unit N005, etc. In addition, optionally, the battery pack unit N001, battery management unit N002, inverter unit N003, electric machine unit N004 and gearbox unit N005 are respectively equipped with corresponding heat dissipation units such as NC001, NC002, NC004 and NC005. Each heat dissipation unit is also in data connection with the client unit N via the onboard data bus, and is started selectively on the basis of an instruction from the client unit N, in order to cool the corresponding unit. For example, the heat dissipation unit may comprise an air-cooling heat dissipation apparatus such as a fan, and/or a water-cooling heat dissipation apparatus.

The client units 1, 2, 3, 4, 5, 6, . . . , N collect a large amount of data from the electric vehicles, and transmit the data to the server unit 200. The server unit 200 uses a Big Data analysis method to analyse the data received.

Figure 3:
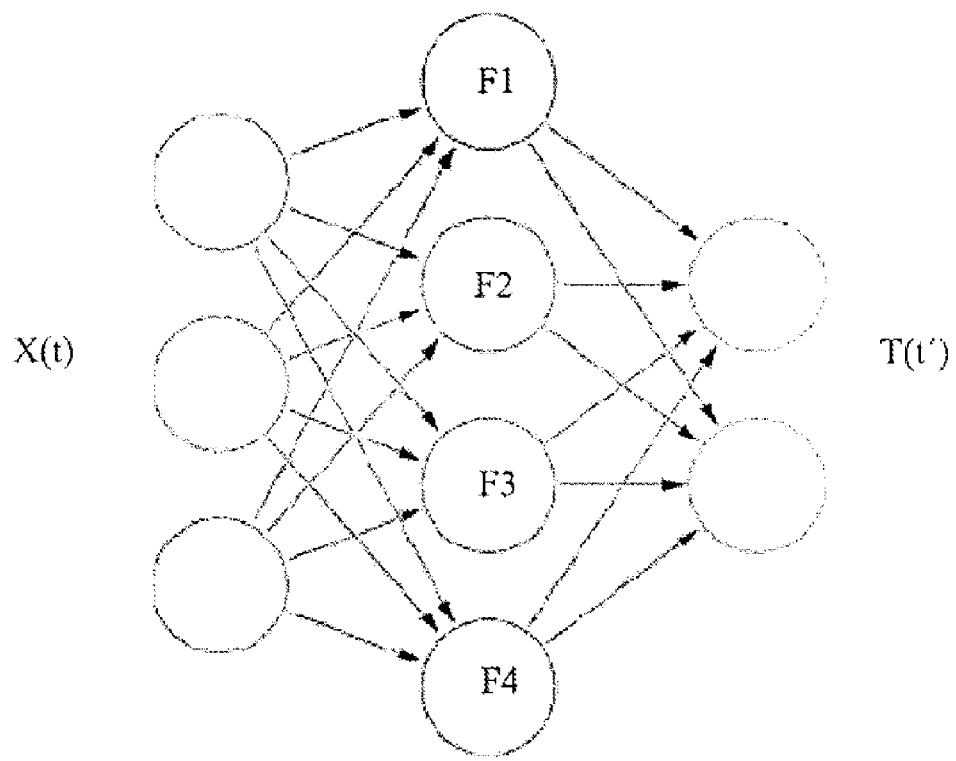
FIG. 3 shows schematically an example of a temperature predictive mathematical model used in an electric vehicle cooling control system.

FIG. 3 shows schematically an example of a temperature predictive mathematical model used in an electric vehicle cooling control system. For example, the mathematical model may be run on the computer of each client unit N and/or the server unit 200. In addition, the mathematical model may be selectively replaced or further optimized by the computer of the server unit 200. The mathematical model may for example be any suitable mathematical model which is capable of realizing Big Data analysis calculation and familiar to those skilled in the art, e.g. an artificial neural network calculation model, a fuzzy logic calculation model, a genetic algorithm calculation model, an adaptive learning calculation model or an artificial intelligence calculation model, etc.

For example, in the case of each electric vehicle, after being started, the client unit thereof may collect in real time a temperature value $T_{N001}$ of the battery pack unit N001, a temperature value $T_{N002}$ of the battery management unit N002, a temperature value $T_{N003}$ of the inverter unit N003, a temperature value $T_{N004}$ of the electric machine unit N004 and a temperature value $T_{N005}$ of the gearbox unit N005, etc. Thus, temperature data T(t) received in real time by each client unit=[$T_{N001}$, $T_{N002}$, $T_{N003}$, $T_{N00}4$, . . . ], wherein t=0 when the electric vehicle is started. Apart from the temperature data, each client unit may also receive corresponding operating parameters after starting of the electric vehicle, e.g. any suitable data such as a voltage $U_{N001}$ and a current INN' of the battery pack unit N001, a power $P_{N002}$ of the battery management unit N002, a voltage $U_{N003}$ and a current Imo of the inverter unit N003, a torque $T_{N004}$, a number of revolutions $n_{N004}$ and a power $P_{N004}$ of the electric machine unit N004, and a torque $T_{N005}$ of the gearbox unit N005. For example, once the electric vehicle has been started, at each time t, the client unit may obtain in real time operating parameters X(t)=[$U_{N001}$, $I_{N001}$, $P_{N002}$, $U_{N003}$, $I_{N003}$, $T_{N004}$, $n_{N004}$, $P_{N004}$, $T_{N005}$,] of the electric vehicle. Those skilled in the art will understand that the temperature data and operating parameter data mentioned above are merely set out in a non-limiting manner; any other receivable and/or usable data that might be thought of by a person skilled in the art may be further added.

A formula T(t')=Func(X(t)) may then be used to predict temperature data (of the relevant unit) at a future time t' (>0, wherein Func is the example of the predictive mathematical model shown in FIG. 3. For example, Func may be a predictive model based on neural network technology. It must be pointed out that the present application is not concerned with the matter of how to determine the predictive model; for example, the predictive model may directly use a model known in the art, or even directly use an existing model in any commercial mathematical calculation software, such as a neuron function in Matlab software, etc. In addition, in the explanation below, technology in commercial mathematical calculation software may also be used directly for example to update the predictive mathematical model. Taking FIG. 3 as an example, an input end at the left side (X(t)) has three terms, which may be electric machine power, number of electric machine revolutions and output torque of the electric vehicle respectively; an output end at the right side (T(t')) has two terms, which may be electric machine temperature and battery temperature; a calculation process Func in the middle may for example be defined by a neuron function in Matlab software. In FIG. 3, the function is defined to have four neurons F1, F2, F3 and F4. However, the number of neurons may be correspondingly increased or decreased according to an increase or decrease in data at the input end. Output data may also be correspondingly increased or decreased. Thus, based on data X(t) acquired in real time, temperature data T(t') at a future time (e.g. after t'=10 minutes) can be predicted. The process of prediction may be realized on the computer of each client unit N and/or the server unit 200.

Figure 4:
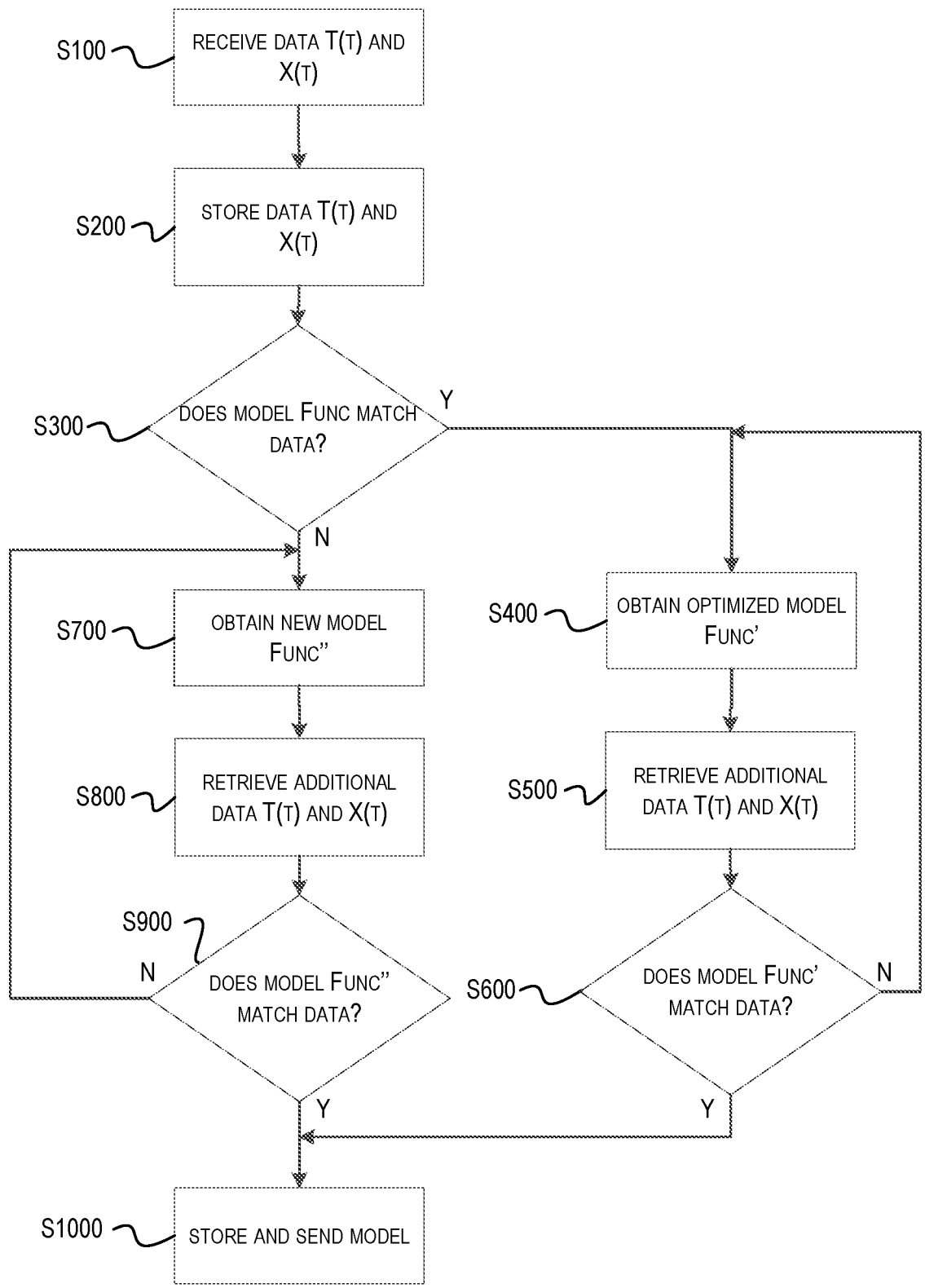
FIG. 4 shows schematically an example of a control method used in a server unit of an electric vehicle cooling control system.

FIG. 4 shows schematically an example of a control method used in a server unit 200 of an electric vehicle cooling control system. In step S100, the server unit 200 receives, from each client unit N, data detected in real time, including temperature data T(t) and operating parameter data X(t). In step S200, the server unit 200 may store these data in a data memory of the server unit 200, and optionally, may store the data in a classified manner for each client unit N respectively. Then in step S300, for a particular client unit, the server unit 200 retrieves a portion of stored temperature data T(t) and operating parameter data X(t) corresponding to the client unit, and retrieves a predictive mathematical model Func currently running on the client unit, and at the same time uses the retrieved operating parameter data X(t) as an input and the retrieved temperature data T(t) as an output, and verifies whether the retrieved data matches the retrieved predictive mathematical model Func. For example, if the difference between an output obtained by using retrieved historical operating parameter data X(t) as an input of the retrieved predictive mathematical model Func and retrieved historical temperature data T(t) is within an allowed limit, it can be concluded that the retrieved data matches the retrieved predictive mathematical model Func, otherwise it can be concluded that there is a mismatch.

If a verification result of step S300 is "yes", then in step S400, the server unit 200 uses a large amount of data already stored to optimize and improve the predictive mathematical model Func, in order to obtain an optimized and improved predictive mathematical model Func'. Then in step S500, the server unit 200 retrieves another portion of stored temperature data T(t) and operating parameter data X(t), different to that retrieved in step S300 and corresponding to the client unit. In step S600, the data retrieved in step S500 is used to further verify, in a manner similar to step S300, whether the improved predictive mathematical model Func' matches. If a verification result of step S600 is "yes", then step S1000 is performed: the improved predictive mathematical model Func' is sent to the corresponding client unit, and at the same time the improved predictive mathematical model Func' is stored in the data memory of the server unit 200, for use in subsequent analysis. For example, the predictive mathematical model can be sent wirelessly to the corresponding client unit as computer instructions. If the verification result of step S600 is "no", then step S400 is performed: the predictive mathematical model is again improved and optimized, for example by replacing data.

If the verification result of step S300 is "no", then in step S700, the server unit 200 may select a new suitable predictive mathematical model Func" on the basis of retrieved data, e.g. may selectively retrieve a predictive model from multiple predictive models stored in the data memory and/or create a new predictive model on the basis of historical data by machine learning. Then in step S800, the server unit 200 retrieves another portion of stored temperature data T(t) and operating parameter data X(t), different to that retrieved in step S300 and corresponding to the client unit. Then in step S900, the data retrieved in step S800 is used to further verify, in a manner similar to step S300, whether the predictive mathematical model Func" determined in step S700 matches. If a verification result of step S900 is "yes", then step S1000 is performed: the updated predictive mathematical model Func" is sent to the corresponding client unit, and at the same time the updated predictive mathematical model Func" is stored in the data memory of the server unit 200, for use in subsequent analysis. If the verification result of step S900 is "no", then step S700 is performed, and the predictive mathematical model is again updated.

In addition, based on data from multiple client units, the server unit 200 may determine whether a predictive mathematical model of a particular client unit amongst the multiple client units matches, and perform a corresponding update. Optionally, the server unit 200 may use a correlation amongst data of multiple client units to determine whether a predictive mathematical model matches data.

Figure 5:
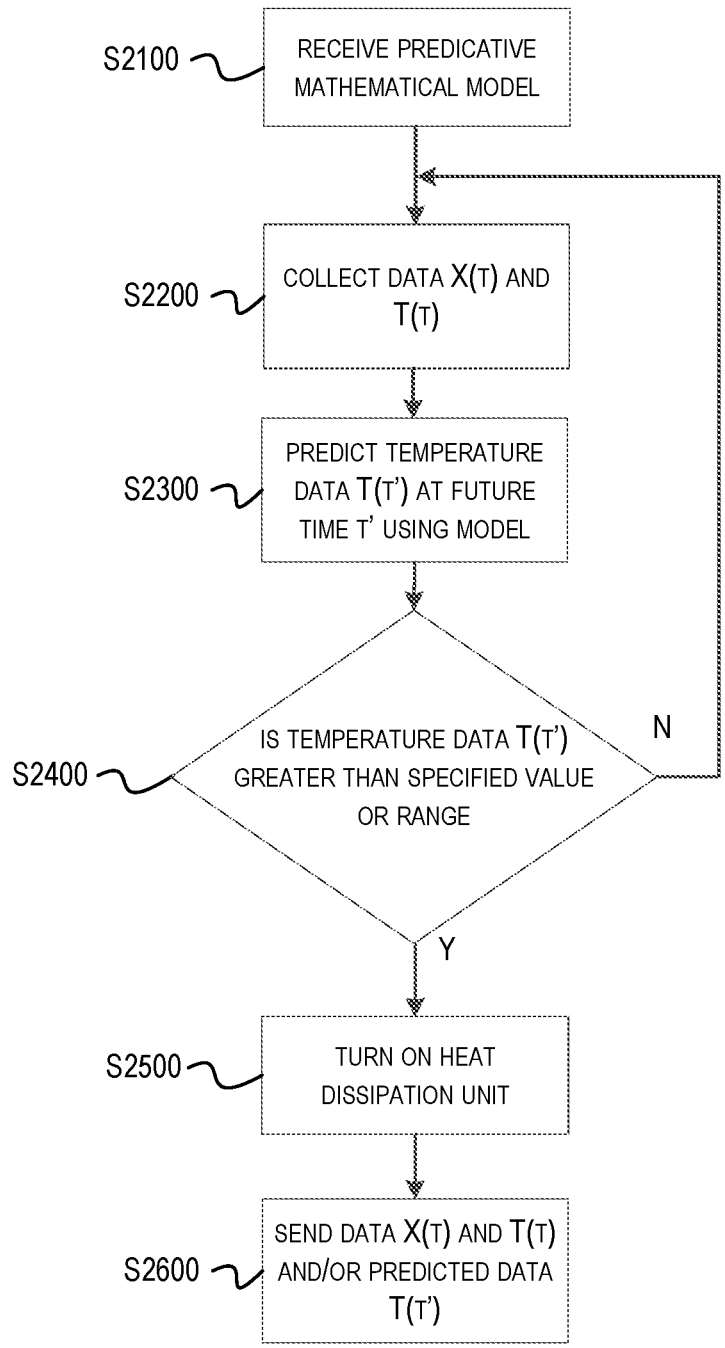
FIG. 5 shows schematically an example of a control method used in a client unit, i.e. in an electric vehicle, of an electric vehicle cooling control system.

FIG. 5 shows schematically an example of a control method used in a client unit, i.e. in an electric vehicle, of an electric vehicle cooling control system. In step S2100, the client unit automatically receives a predictive mathematical model from a server unit 200, e.g. the mathematical model Func' or Func" in FIG. 4. Alternatively and/or optionally, in step S2100, a driver of the electric vehicle may himself/herself select a suitable predictive mathematical model from a data memory of the client unit. For example, when the driver observes that the electric vehicle is about to go uphill, go downhill or enter a congested section of road, a preset predictive mathematical model may be selected via an onboard touch screen. In step S2200, the client unit collects operating parameter data X(t) and temperature data T(t) in real time. In step S2300, the client unit predicts temperature data T(t') at a future time t' on the basis of the predictive mathematical model determined in step S2100. In step S2400, it is determined whether the temperature data T(t') is greater than a specified value $T_{lim}$ or range. Taking temperature data T(t') of a battery pack unit as an example, if it is higher than a particular pre-specified limit value, then it is concluded that a determination result of step S2400 is "yes", otherwise it is "no". If the determination result of step S2400 is "no", then step S2200 is performed. If the determination result of step S2400 is "yes", then step S2500 is performed. In step S2500, the client unit turns on a corresponding heat dissipation unit of the electric vehicle. For example, if the temperature data T(t') of the battery pack unit is greater than a specified range, then a heat dissipation unit of the battery pack unit is correspondingly turned on. Then in step S2600, the client unit sends the operating parameter data X(t) and temperature data T(t) collected in real time and/or the predicted temperature data T(t') to the server unit 200, for further reference.

The processes described in FIGS. 4 and 5 may for example run after start-up of the server unit 200 and each client unit. Those skilled in the art will understand that the process steps described in FIGS. 4 and 5 are merely optional, and may be correspondingly increased or decreased according to particular circumstances.

In the present application, the electric vehicle cooling control system comprising the server unit 200 and client units is constructed on the basis of cloud computing. As the number of client units is increased, the predictive mathematical models can be updated more precisely, in order to increase the success rate of temperature rise prediction for units requiring to be cooled in the electric vehicle. In addition, for each client unit, the input of the predictive mathematical model is not limited to operating parameter data; for example, other information capable of being used to predict a heat dissipation condition of a relevant unit of an electric vehicle, such as geographic information, road condition information and navigation information, may also be used as the input. In the context of the present application, these input data of the predictive mathematical model are referred to collectively as calculation input data, and temperature output data of the predictive mathematical model are referred to collectively as temperature data.

Although specific embodiments of the present application have been described in detail here, they have been given purely for the purpose of explanation, and should not be regarded as limiting the scope of the present application. In addition, those skilled in the art will understand that the embodiments described herein may be used in combination with each other. Various substitutions, changes and modifications may be conceived on condition that the spirit and scope of the present application are not departed from.

The invention claimed is:

1. A cooling control system for a motor vehicle comprising:
    an electronic server (200); and
    a plurality of electronic client devices, each of the plurality of electronic client devices being in data connection with each of a plurality of different units requiring cooling, the plurality of different units including a battery pack unit, a battery management unit, an inverter unit, an electric machine unit, and a gearbox unit and each of the plurality of different units being arranged on the motor vehicle, each of the plurality of electronic client devices including a first electronic processor configured to
        perform real-time collection and storage of operating parameter input data (X(t)) of the plurality of different units on the motor vehicle for evaluating a temperature of a relevant unit of the plurality of different units requiring cooling on the motor vehicle,
        perform real-time collection and storage of temperature data (T(t)) of the relevant unit requiring cooling,
        predict, using the collected operating parameter input data (X(t)) of the plurality of different units, temperature data (T(t')) at a future time of the relevant unit requiring cooling based on a predictive mathematical model (Func) determined by the server (200), and
        enable a selective cooling in advance of the relevant unit requiring cooling based on the predicted temperature data (T(t')),
    wherein the server includes a second electronic processor configured to receive the collected operating parameter input data (X(t)) and temperature data (T(t)) from each of the plurality of electronic client devices and, based on the received data (X(t)) and T(t)), optimize and improve the predictive mathematical model (Func) or create a new predictive mathematical model (Func").

2. The cooling control system as claimed in claim 1, wherein for the predictive mathematical model (Func) currently being used by each of the plurality of electronic client devices, the electronic server (200) uses at least a portion of the operating parameter input data (X(t)) and at least a portion of the temperature data (T(t)) as an input and an output of the predictive mathematical model (Func) respectively, to verify the predictive mathematical model (Func).

3. The cooling control system as claimed in claim 2, wherein, when a verification result of the electronic server (200) indicates that an output of the predictive mathematical model (Func) does not match retrieved historical temperature data, the predictive mathematical model (Func) is replaced by the new predictive mathematical model (Func").

4. The cooling control system as claimed in claim 3, wherein the new predictive mathematical model (Func") is selected by the electronic server (200) from a data memory of the electronic server (200) based on data already received or the new predictive mathematical model (Func") is generated by the electronic server (200) based on data already received.

5. The cooling control system as claimed in claim 2, wherein, when a verification result of the electronic server (200) indicates that an output of the predictive mathematical model (Func) matches retrieved historical data, the electronic server (200) optimizes and improves the predictive mathematical model (Func) based on data already received, to generate an optimized and improved predictive mathematical model (Func').

6. The cooling control system as claimed in claim 1, wherein the new predictive mathematical model (Func") or the optimized and improved predictive mathematical model (Func') is sent to the respective electronic client device for use and is stored in a data memory of the electronic server (200).

7. The cooling control system as claimed in claim 1, wherein the cooling control system further includes a heat dissipation unit for the relevant unit requiring cooling in the motor vehicle, and when the predicted temperature data (T(t')) is greater than a specified value ($T_{lim}$), the corresponding electronic client device of the plurality of electronic client devices starts the heat dissipation unit, cooling the relevent unit requiring cooling in advance.

8. The cooling control system as claimed in claim 7, wherein the predictive mathematical model (Func) used on each electronic client device of the plurality of electronic client devices is actively selected by a driver of the motor vehicle.

9. The cooling control system as claimed in claim 1, wherein, based on data from multiple electronic client devices, the electronic server (200) determines whether the predictive mathematical model of one of the plurality of electronic client devices matches data thereof.

10. The cooling control system as claimed in claim 1, wherein the operating parameter input data (X(t)) includes either or both operating parameter data of the first unit requiring cooling and road condition data of the motor vehicle, the road condition data being obtained from either or both real-time navigation and satellite positioning data of the motor vehicle.

11. A cooling control method for a motor vehicle including a plurality of electronic client devices, each of the plurality of electronic client devices being in data connection with a plurality of different units requiring cooling, the plurality of different units including a battery pack unit, a battery management unit, an inverter unit, an electric machine unit, and a gearbox unit and each different units being arranged on the motor vehicle, and each of the plurality of different units being arranged on the motor vehicle and each of the plurality of electronic client devices including a first electronic processor, and an electronic server including a second electronic processor, the electronic server (200) being in data connection with each of the plurality of electronic client devices via a wireless network, the method comprising:

real-time collecting and storing of operating parameter input data (X(t)) of the plurality of different units on the motor vehicle;

evaluating a temperature of a relevant unit of the plurality of different units requiring cooling on the motor vehicle;

real-time collecting and storing of temperature data (T(t)) of the relevant unit requiring cooling;

predicting, using the collected operating parameter data (X(t)), temperature data (T(t')) at a future time of the relevant unit requiring cooling based on a predictive mathematical model (Func) determined by the electronic server (200), via the respective first electronic processor; and enabling a selective cooling, in advance, of the relevant unit requiring cooling based on the predicted temperature data (T(t')), wherein the second electronic processor of the electronic server (200) is configured to receive the collected operating parameter input data (X(t)) and temperature data (T(t)) and, based on the received operating parameter data (X(t) and the temperature data T(t)), optimize and improve the predictive mathematical model (Func) or create a new predictive mathematical model (Func").

12. The cooling control method as claimed in claim 11, wherein, for the predictive mathematical model (Func) currently being used by each of the plurality of electronic client devices, the electronic server (200) uses at least a portion of the operating parameter data (X(t)) and at least a portion of the temperature data (T(t)) received as an input and an output of the predictive mathematical model (Func) respectively, to verify the predictive mathematical model (Func).

13. The cooling control method as claimed in claim 12, wherein when a verification result of the electronic server (200) indicates that an output of the predictive mathematical model (Func) does not match retrieved historical temperature data, the predictive mathematical model (Func) is replaced by the new predictive mathematical model (Func").

14. The cooling control method as claimed in claim 13, wherein the new predictive mathematical model (Func") is selected by the electronic server (200) from a data memory of the electronic server (200) based on data already received or the new predictive mathematical model (Func") is generated by the electronic server (200) based on data already received.

15. The cooling control method as claimed in claim 12, wherein when a verification result of the electronic server (200) indicates that an output of the predictive mathematical model (Func) matches retrieved historical data, the electronic server (200) optimizes and improves the predictive mathematical model (Func) based on data already received, to generate an optimized and improved predictive mathematical model (Func').

16. The cooling control method as claimed in claim 14, wherein the new predictive mathematical model (Func") or the optimized and improved predictive mathematical model (Func') is sent to the respective electronic client device for use and is stored in a data memory of the electronic server.

17. The cooling control method as claimed in claim 11, further comprising a heat dissipation unit for the relevant unit requiring cooling in the motor vehicle, and when the predicted temperature data (T(t')) is greater than a specified value ($T_{lim}$), the corresponding electronic client device of the plurality of electronic client devices activates the heat dissipation unit, cooling the relevant unit requiring cooling in advance.

18. The cooling control method as claimed in claim 17, wherein the predictive mathematical model (Func) used on each of the plurality of electronic client devices is actively selected by a driver of the motor vehicle.

19. The cooling control method as claimed in claim 11, wherein the operating parameter input data (X(t)) includes either or both operating parameter data of the first unit requiring cooling and road condition data of the motor vehicle, the road condition data being obtained from either or both real-time navigation and satellite positioning data of the motor vehicle.

20. The cooling control method as claimed in claim 11, wherein, based on data from multiple electronic client devices of the plurality of electronic client devices, the electronic server determines whether the predictive mathematical model of one of the multiple electronic client devices matches data thereof.

21. An electronic client device configured to be mounted on a motor vehicle, the electronic client device being in data connection with each of a plurality of different units requiring cooling, the plurality of different units including a battery pack unit, a battery management unit, an inverter unit, an electric machine unit, and a gearbox unit and each of the plurality of different units being arranged on the motor vehicle, the electronic client device including a first electronic processor configured to:

perform real-time collection and storage of operating parameter input data (X(t)) of the plurality of different units, which is used to evaluate a temperature of a relevant unit of the plurality of different units requiring cooling on the motor vehicle, perform real-time collection and storage of temperature data (T(t)) of the relevant unit requiring cooling, predict, using the operating parameter input data (X(t)), temperature data (T(t')) at a future time of the relevant unit requiring cooling, based on a predictive mathematical model (Func) determined by an electronic server (200) of the cooling control system, wherein a heat dissipation unit is provided for the relevant unit requiring cooling in the motor vehicle and, when the predicted temperature data (T(t')) is greater than a specified value ($T_{lim}$), the electronic client device activates the heat dissipation unit, cooling the relevant unit requiring cooling in advance.

22. The cooling control system as claimed in claim 1, wherein the relevant unit is one selected from the group consisting of an inverter unit, an electric machine unit, and a gearbox unit.

23. The cooling control system as claimed in claim 1, wherein the first electronic processor is further configured to perform real-time collection and storage of operating parameter input data (X(t)) of the plurality of different units on the motor vehicle for evaluating a temperature of a second relevant unit of the plurality of different units requiring cooling on the motor vehicle, the second relevant unit being a different type of unit than the relevant unit, perform real-time collection and storage of temperature data (T(t)) of the second relevant unit requiring cooling, predict, using the collected operating parameter input data (X(t)) of the plurality of different units, temperature data (T(t')) at a future time of the second relevant unit requiring cooling based on a predictive mathematical model (Func) determined by the server (200), and
enable a selective cooling in advance of the relevant unit requiring cooling based on the predicted temperature data (T(t')).

24. The cooling control system as claimed in claim 23, wherein one of the relevant unit and the second relevant unit is the battery pack unit, the other of the relevant unit and the second relevant unit is the electric machine unit.

\* \* \* \* \*